United States Patent
Pande et al.

(10) Patent No.: US 7,269,671 B2
(45) Date of Patent: Sep. 11, 2007

(54) SYSTEMS, METHODS AND COMPUTER PROGRAM PRODUCTS FOR LEAKAGE-PROOF PROGRAM PARTITIONING

(75) Inventors: Santosh Pande, Norcross, GA (US); Tao Zhang, Atlanta, GA (US); Andre Dos Santos, Cumming, GA (US); Franz Josef Bruecklmayr, Kaufering (DE)

(73) Assignees: Georgia Tech Research Corporation, Atlanta, GA (US); Infineon Technologies AG, Munich (DE)

( * ) Notice: Subject to any disclaimer, the term of this patent is extended or adjusted under 35 U.S.C. 154(b) by 277 days.

(21) Appl. No.: 10/454,037

(22) Filed: Jun. 4, 2003

(65) Prior Publication Data
US 2004/0073898 A1   Apr. 15, 2004

Related U.S. Application Data

(60) Provisional application No. 60/385,713, filed on Jun. 4, 2002.

(51) Int. Cl.
*G06F 13/00*   (2006.01)
(52) U.S. Cl. .......................... 710/33; 711/173; 713/187
(58) Field of Classification Search ................ 711/173; 710/1, 100, 33–35, 58–61; 713/185, 187; 717/136–160
See application file for complete search history.

(56) References Cited

U.S. PATENT DOCUMENTS 5,375,125 A  * 12/1994  Oshima et al. ............... 714/38
5,555,417 A  *  9/1996  Odnert et al. ................ 717/159
5,790,760 A  *  8/1998  Arima .......................... 706/45

FOREIGN PATENT DOCUMENTS

| EP | 0 811 911 A3 | 12/1997 |
|---|---|---|
| WO | 0203022 A1 | 1/2002 |
| WO | 0242912 A1 | 5/2002 |
| WO | WO 3102769 A2 * | 12/2003 |

OTHER PUBLICATIONS

Emin Gun Sirer, et al., "A Pratical Approach for Improving Startup Latency in Java Applications", Workshop on Compiler Support for System Software and ACM Sigplan, (1999), pp. 47-55.

(Continued)

*Primary Examiner*—Christopher Shin
(74) *Attorney, Agent, or Firm*—Sutherland Asbill & Brennan LLP

(57) ABSTRACT

Systems, methods and computer program products partition a whole program when it does not fit in a device's memory. Minimal, safe program partitions are downloaded from the server on demand into the embedded device just before their execution. Code and data of the program are partitioned such that no information regarding the control flow behavior of the program is leaked out. Thus, by observing the program partitions that are downloaded from the server to the device, an attacker is unable to guess which branches are taken in the program and what is the control flow of the program. This property of tamper resistance is valuable for secure embedded devices, such as smart cards, which could hold sensitive information and/or carry out critical computation such as financial transactions.

19 Claims, 14 Drawing Sheets

OTHER PUBLICATIONS

Zdancewic, "Untrusted Hosts and Confidentiality: Secure Program Partitioning", Proceedings of the Eighteenth ACM Symposium on Operating Systems Principles, (2000), pp. 1-14.

Zhang, "Leakage-Proof Program Partitioning", Proceedings of the International Conference on Compilers, Architecture and Synthesis for Embedded Systems, (2002), pp. 136-145.

* cited by examiner

Let $s_0 = 1$.
For $k = 0$ upto $w-1$:
    If (bit k of x) is 1 then
        Let $R_k = (s_k * y) \mod n$.
    Else
        Let $R_k = s_k$.
    Let $s_{k+1} = R^2_k \mod n$.
EndFor.
Return ($R_{w-1}$).

```
struct CallGraphNode
{
    BOOL visited;
    BOOL non_recurring;
    BOOL is_single_occurrence;   // only one static occurrence?
    BOOL is_in_loop;             // is in a loop body?
    BOOL is_addr_taken;          // ever assigned to a function pointer?
    CallGraphNode * preds;
    CallGraphNode * succs;
};
void find_nonrecurring_functions()
{
    CallGraphNode * root = build_augmented_call_graph();
    en_queue ( root );
    While ( ! is_queue_empty())
    {
        cur_node = de_queue();
        if ( cur_node→visited)
            continue;
        cur_node → non_recurring = FALSE;
        if ( cur_node == root)    // root node
        {
            cur_node→non_recurring = TRUE;
        }
        else if ( cur_node→is_single_occurence)
        {
            pred = cur_node→ preds;   // single predecessor
            if (pred → non_recurring && !cur_node→ is_in_loop && !cur_node→is_addr_taken)
                cur_node → non_recurring = TRUE;
        }
        cur_node → visited = TRUE;
        for ∀ succ ∈ cur_node→ succs
            en_queue ( succ );
    }
}
```

FIG. 3

```
void partition_non_recurring_under_keep_nothing ( non_recurring_function )
{
    cfg = build_function_CFG ( non_recurring_function );
    dominance_analysis_identify_loop_body( cfg );
    for ∀ basic_block ∈ cfg
    {
        // basic block has been processed ?
        if ( is_in_created_safe_partitions ( basic_block) )
            continue;
        if ( is_inside_loop_body (basic_block) )
            create_new_minimal_safe_partition ( get_loop_body (basic_block));
        else
            create_new_minimal_safe_partition (basic_block);
    }
}
```

FIG. 7   100

```
void partition_recurring_under_keep_nothing (recurring_function)
{
    cfg = build_function_CFG (recurring_function);
    reduced_cfg = build_reducedCFG (cfg) ;

for ∀ reducedCFG_node ∈ reduced_cfg
        create_new_minimal_safe_partition (reducedCFG_node );
}

ReducedCFG * build_reducedCFG ( CFG* cfg)
{
    dominance_analysis_identify_loop_body( cfg );

for ∀ basic_block ∈ cfg
    {
        // basic block has been processed ?
        if ( is_in_created_reducedCFG_node ( basic_block) )
            continue;
        if ( is_inside_loop_body (basic_block) )
            create_new_reducedCFG_node ( get_loop_body (basic_block));
        else
            create_new_reducedCFG_node (basic_block);
    }
    return reduced_cfg;
}
```

```
void non_dereferenced_data_partitioning ( SafePartition * safe_partition)
{
    for ∀ cfg_node ∈ safe_partition→cfg_node_set
    {
        InstrList * instr_list = get_instr_list (cfg_node);
        for ∀ instr ∈ instr_list
        {
            for (index = 0; index < src_opnds_size(instr); index++)
            {
                Opnd opnd = get_src (instr, index);
                VariableSymbol* var = NULL;
                if (is_variable (opnd))
                {
                    var = get_variable (opnd);
                }
                if (var)
                    safe_partition→add_to_non_dereferenced_data_set(var);
            }
            for (index = 0; index < dst_opnds_size(instr); index++)
            {
                Opnd opnd = get_dst (instr, index);
                VariableSymbol* var = NULL;
                if (is_variable (opnd))
                {
                    var = get_variable (opnd);
                }
                if (var)
                    safe_partition→add_to_non_dereferenced_data_set(var);
            }
        }
    }
}
```

FIG. 9

```
void dereferenced_data_partitioning ( SafePartition * safe_partition)
{
    for ∀ cfg_node ∈ safe_partition→cfg_node_set
    {
        InstrList * instr_list = get_instr_list (cfg_node);
        for ∀ instr ∈ instr_list
        {
            op_code = get_opcode (instr);
            if((op_code==LOD)|| (opcode==STR)||(opcode==MEMCPY))
            {
                LocationSet ** location_sets = get_location_sets (instr);
                for ∀ location_set ∈ location_sets
                {
                    int opnd_index = location_set→get_value(0);
                    if (opnd_index== -2)||(opnd_index== -3))
                    {
                        for( int index =1; index < location_set→size(); index++)
                        {
                            int location = location_set→get_value(index);
                            VariableSymbol * var = location_to_variable(location);
                            if (var)
                                safe_partition→add_to_dereferenced_data_set (var);
                        }
                    }
                }
            }
        }
    }
}
```

```
MergedPartition* minimal_safe_partitions_merging (SafePartition *topo_ordered_minimal_partition_list)
{
    MergedPartition *merged_partition_list = NULL;
    MergedPartition *cur_merged_partition = NULL;
    MergedPartition *prev_merged_partition = NULL;
    for(cur_partition=topo_ordered_minimal_partition_list; cur_partition;)
    {
        if(!cur_merged_partition)  //create a new merged partition
        {
            cur_merged_partition = new_merged_partition();
            if(prev_merged_partition)
                prev_merged_partition→next = cur_merged_partition;  //chain it up
            if(!merged_partition_list)
                merged_partition_list = cur_merged_partition;    //merged partition list head
        }
        // the first case, the current minimal partition can be merged into the current merged partition
        if(((cur_merged_partition→instrs_count + cur_partition→instrs_count) <= CODE_LIMIT) &&
           data_size(cur_merged_partition→data_set ∪ cur_partition→data_set) <= DATA_LIMIT)
        {
            cur_merged_partition→insert(cur_partition);
            cur_partition = cur_partition→next;
            continue;
        }
        // the second case, the minimal partition itself is too big, it will be a merged partition itself
        else if (cur_merged_partition→is_empty() &&
                (cur_partition→instrs_count > CODE_LIMIT ||
                 cur_partition→data_set > DATA_LIMIT))
        {
            cur_merged_partition→insert(cur_partition);
            cur_partition = cur_partition→next;
        }
        // end of the current merged_partition
        prev_merged_partition = cur_merged_partition;
        cur_merged_partition = cur_merged_partition→next;
    }
    return merged_partition_list;
}
```

FIG. 11

```
void identify_hot_function_set (struct CallTraceElm ** call_trace)
{
    int total_misses = 0;
    for (int index = 0; index < length(call_trace); index++)
    {
        struct CallTraceElm* call_trace_elm = call_trace[index];
        struct HotSetElm* hotset_elm = search_in_current_hotset ( call_trace_elm->called_func_id);
        if(hotset_elm) // hot set hit
        {
            hotset_elm->freq++;
            hotset_elm->last_occurrence = index;
        }
        else // hot set miss
        {
            if( number of call trace elements scanned since last hot set eviction > MAX_HOTSET_SIZE)
            {
                total_misses ++;
                if( total_misses > MAX_MISSES_ALLOWED)
                {
                    total_misses = 0;
                    evict_current_hotset();
                }
            }
            struct HotSetElm* new_hotset_elm = new_hotset_elm();
            new_hotset_elm->freq = 1;
            new_hotset_elm->func_id = call_trace_elm->called_func_id;
            new_hotset_elm->first_occurence = new_hotset_elm->last_occurrence = index;
            add_to_current_hotset(new_hotset_elm);
        }
    }
}
void evict_current_hotset(struct CallTraceElm ** call_trace)
{
    for ∀ hotset_elm ∈ current_hotset
    {
        if(hotset_elm->freq >= MIN_HIT_FREQENCY)
        {
            for(int index = hotset_elm->first_occurrence; index<=hotset_elm->last_occurrence; index++)
            {
                struct CallTraceElm * call_trace_elm = call_trace[index];
                struct FunctionSet * to_be_cached_function_set = get_to_be_cached
                    (call_trace_elm->calling_func_id, call_trace_elm->calling_BB_id);
                to_be_cached_function_set->add_function(hotset_elm->called_func_id);
            }
        }
    }
}
```

FIG. 12

```
void determine_additional_call_needed()
{
    Iteratively do the following until the state is stable:
    for ∀ basic_block ∈ program control flow graph
    {
        CallSite* p = basic_block->get_call_site();
        //normal case, we have to ask the runtime environment to find out the difference
        if(p) p->need_update_call = TRUE;
        // the exit_cached_in_runtime function set of all the predecessors during runtime can be determined
        // statically and they all have the same function set
        if (for any predecessor pred of basic_block, pred->exit_determinable ==TRUE &&
                pred->exit_cached_in_runtime is same as that of other predecessors)
        {
            //we know at the entry of the basic block, the cached set in runtime is guaranteed to be
            // basic_block->entry_cached_in_runtime
            basic_block->entry_determinable = TRUE;
            basic_block->entry_cached_in_runtime = pred->exit_cached_in_runtime;
            if(p)
            {
                //if to-be-cached set at p is same as entry_cached_in_runtime, no update is needed
                if(p->to_be_cached == basic_block->entry_cached_in_runtime)
                    p->need_update_call = FALSE;
                //otherwise, we can derive the difference in compile time and save runtime environment
                //from computing the difference
                else
                    p->only_need_simple_update_call = TRUE;
            }
        }
        else
        {
            basic_block->entry_determinable = FALSE;
        }
        // if there is a call site, then we know the cached set at the exit of the basic block
        if(p)
        {
            basic_block->exit_determinable = TRUE;
            basic_block->exit_cached_in_runtime = p->to_be_cached;
        }
        // no call site, information passes through
        else
        {
            basic_block->exit_determinable = basic_block->entry_determinable;
            basic_block->exit_cached_in_runtime =basic_block->entry_cached_in_runtime;
        }
    }
}
```

FIG. 14

SYSTEMS, METHODS AND COMPUTER PROGRAM PRODUCTS FOR LEAKAGE-PROOF PROGRAM PARTITIONING

RELATED APPLICATION DATA

The present invention claims the benefit of U.S. Provisional Patent Application Serial No. 60/385,713, filed Jun. 4, 2002, titled "Systems and Methods For Performing Leakage-Proof Program Partitioning For Embedded Devices", the contents of which are hereby incorporated by reference as if set fully herein.

FIELD OF THE INVENTION

The present invention relates generally to systems, methods and computer program products for partitioning programs. More particularly, the invention relates to systems, methods and computer program products for partitioning the code and data of a program to permit program partitions to run on a memory constrained device and to ensure tamper resistance during the downloading of the program partitions to the device.

BACKGROUND OF THE INVENTION

One of the important embedded devices that offer a tamper-resistant, secure environment is a smart card. The typical application execution scenario in smart cards involves the data being downloaded on it in an encrypted manner and the entire application executing inside it. This results in an important property of tamper resistance. Since no part of an application resides outside, for an attacker, smart card is like a black box inside which nobody knows what is going on. In other words, one is unable to observe application properties from outside the card offering tamper resistance.

A big concern of new generation of smart cards is memory resource limitation. Smart cards typically have only 8–64 KB memory which prevents large applications from residing on the smart card. Typically, multiple applications spread across multiple vendors require a high inter-operability and need large amount of resources. Added to the resource limitation are security related overheads which make even lesser space available to application developers. For example, complex encryption/decryption schemes, advanced security and transaction protocols and various authentication applications such as biometric codes have large data and/or code segments and it is a major struggle to put these features inside smart cards. This has led smart card application domains to be very limited and customized. In order to facilitate multi-applications and/or to fit large applications in the card, they must be broken into pieces. In other words, the smart card memory would hold only those parts of applications currently active or ready-to-execute. However, partitioning an application means that part of it will reside outside of the card. Furthermore, application partitions transmitted to the smart card could reveal the application behavior which in turn could be used by an attacker to launch a malicious attack. Thus, one must ensure that the partitions that are downloaded to the card do not reveal information.

There are many different means by which information leakage occurs as a result of program behavior. They are based on observable program properties by the attacker and include timing behavior, power behavior and control flow behavior. For example, by observing timing, one may guess that a loop is executing or by observing power consumption, or one may guess that a lot of memory operations are going on. This information can then be used to tamper with the secure system. Leakage of timing or power information is a somewhat indirect way to get information about the program properties and an attacker might have to resort to somewhat involved experiments to get the differential behavior. Leakage of control flow behavior of an application on the other hand, can be very dangerous and it is much simpler for an attacker to find out the differential behavior. Even arbitrary partitioning can introduce control flow information leakage and present a security hazard, which is the central problem encountered in program partitioning for tamper-resistant devices.

The potential danger of arbitrary partitioning is illustrated with reference to FIGS. 1A and 1B. FIG. 1A shows a basic and naïve partitioning algorithm 10, which partitions the program into basic blocks, and FIG. 1B shows a Control Flow Diagram (CFG) 11 corresponding to the algorithm 10. Briefly, this algorithm 10 allows fine control over downloading only those parts of the program which are needed during execution.

Systems such as Die-Hellman and RSA, as are known in the art, may include, for example, private key operations consisting of computing $R=y^x$ mod n, where n is public and y can be found by an eavesdropper. The attacker's goal is to find x, the secret key. To illustrate the problem, it may be presumed that the implementation uses the simple modular exponentiation algorithm of FIG. 1A which computes $R=y^x$ mod n, where x is w bits long. The corresponding CFG 11 for this small partition of code is shown in FIG. 1B.

Assuming the algorithm is used to partition a program transmitted to a smart card, where the card side will ask for a program partition every time it needs it (i.e., it does not cache any program partitions for memory efficiency purpose), it is apparent that inside the loop body if the current examined bit of x is 1, then the IF-part is executed (block 16). If the current examined bit of x is 0, then the Else-part is executed (block 18). The algorithm loop (blocks 14, 20) result in a sequence of IF or ELSE blocks being transmitted through the network. If the attacker monitors this sequence, from its knowledge the attacker can guess whether the respective bits of x were 0's or 1's and obtain the secret key x. The attacker need not know whether it is a IF part or ELSE part; mere ability to differentiate IF part and ELSE part enables the guess of key x, due to the fact that the key, or its complement, was guessed. The attack thus utilizes the different program partition sequences to infer the program behavior.

The concept behind the type of attack illustrated in FIGS. 1A and 1B is similar to timing and power differential attacks. Each method seeks to exploit information from the differences that are available to the attacker. All an attacker needs to do is to sniff mobile code packets from the network during transmission, match them to the ones previously transmitted and then try to guess the behavior from the sequence constructed. Armed with a reasonable computing power and a network tap, an attacker can exploit the security deficiencies of a system. It will also be appreciated that even if the downloaded partitions are encrypted it such an attack is not prevented. Typically, because a given partition and its encrypted version will have one to one relationship, an attacker can match encrypted versions of multiply transmitted partitions, sequence them and then exploit the same information from the encrypted sequence as she would from the unencrypted one.

In the illustrate example described above, it is clear that the major problem of partitioning by basic blocks is that the resulting partition exposes all the control flow information. After multiple iterations of a loop, by watching the sequence of program partitions transmitted, the attacker can know there is a loop and which partition is loop entry, which is loop end. The attacker can also know inside the loop body there is an IF-ELSE structure and which is the program partition controlling the branch. The attacker can virtually deduce all control information of the source program, which will lead to great potential security hole.

As is apparent from the above discussion and illustrative example, what is therefore needed are systems, methods and computer program products for partitioning a program while concealing control flow information such that an attacker can not guess a program's behavior by observing the program partitions transmitted through the network that are downloaded to a device. What is also needed is a method and computer program products for partitioning the code and data of a program to permit program partitions to run on a memory constrained device while ensuring tamper resistance during the downloading of the program partitions to the device.

SUMMARY OF THE INVENTION

To facilitate the execution of sizeable programs on devices having limited available memory, such as smart cards, systems, methods and computer program products of the present invention partition a whole program when it does not fit in the devices memory. Minimal, safe program partitions are downloaded from the server on demand into the embedded device just before execution. The systems, methods and computer program products partition the code and data of the program such that no information regarding the control flow behavior of the program is leaked out. In other words, by observing the program partitions that are downloaded from the server, an attacker is unable to guess which branches are taken in the program and what is the control flow of the program. This property, referred to herein as tamper resistance, is valuable for secure embedded devices such as smart cards, which could hold sensitive information and/or carry out critical computation such as financial transactions.

According to one aspect of the invention, systems, methods and computer program products of the present invention partition mobile code programs for code and data in a server side (in a system where programs are communicated from the server side to a device), resulting in independent program partitions which include both code and the data accessed by the code. The information included in each program partition is adequate for its execution. Mobile code partitions are downloaded into a device, such as an embedded device, one-by-one on demand. After the execution of one partition completes, the next partition is requested from the server; at the same time the updated data value may be sent back to the server to achieve data consistency on the server side. Furthermore, at the server side, each requested partition may be dynamically optimized at an intermediate form (IF) level before being sent to the embedded device.

It should be appreciated that although the present invention is described with respect to smart cards, it will also be appreciated that the methods and computer program products of the present invention are useful for any security and/or memory constrained devices, such as mobile or cellular phones, personal data assistants (PDAs), handheld computers, and the like, which may benefit from increased security and/or a decrease in the required application and data memory.

BRIEF DESCRIPTION OF THE DRAWINGS

Figures 1A, 1B:
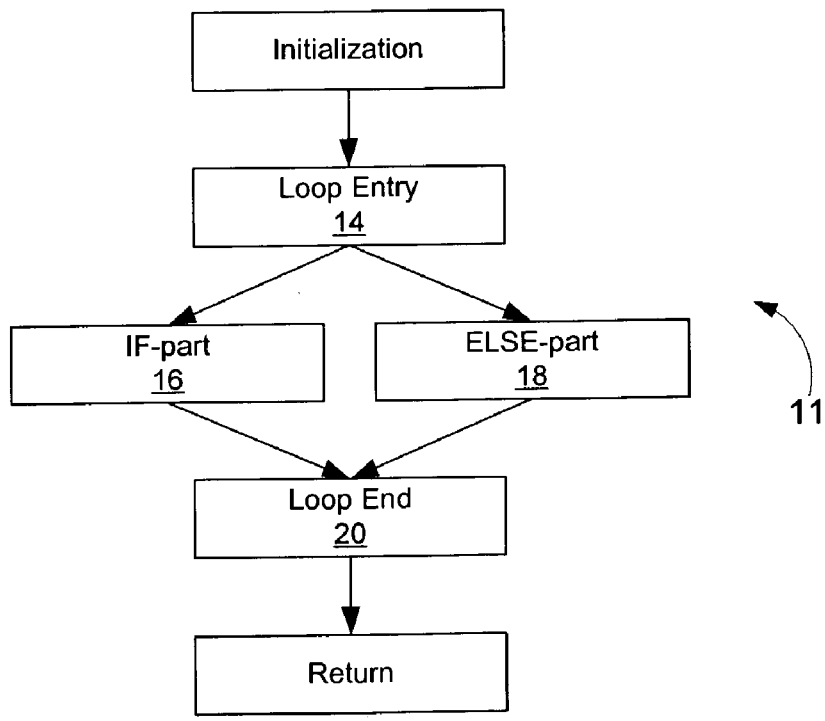

Having thus described the invention in general terms, reference will now be made to the accompanying drawings, which are not necessarily drawn to scale, and wherein:

FIG. 1A shows an illustrative basic partitioning algorithm that reveals program control flow information.

FIG. 1B shows a block diagram control flow diagram of the basic partitioning algorithm of FIG. 1A.

Figure 2:
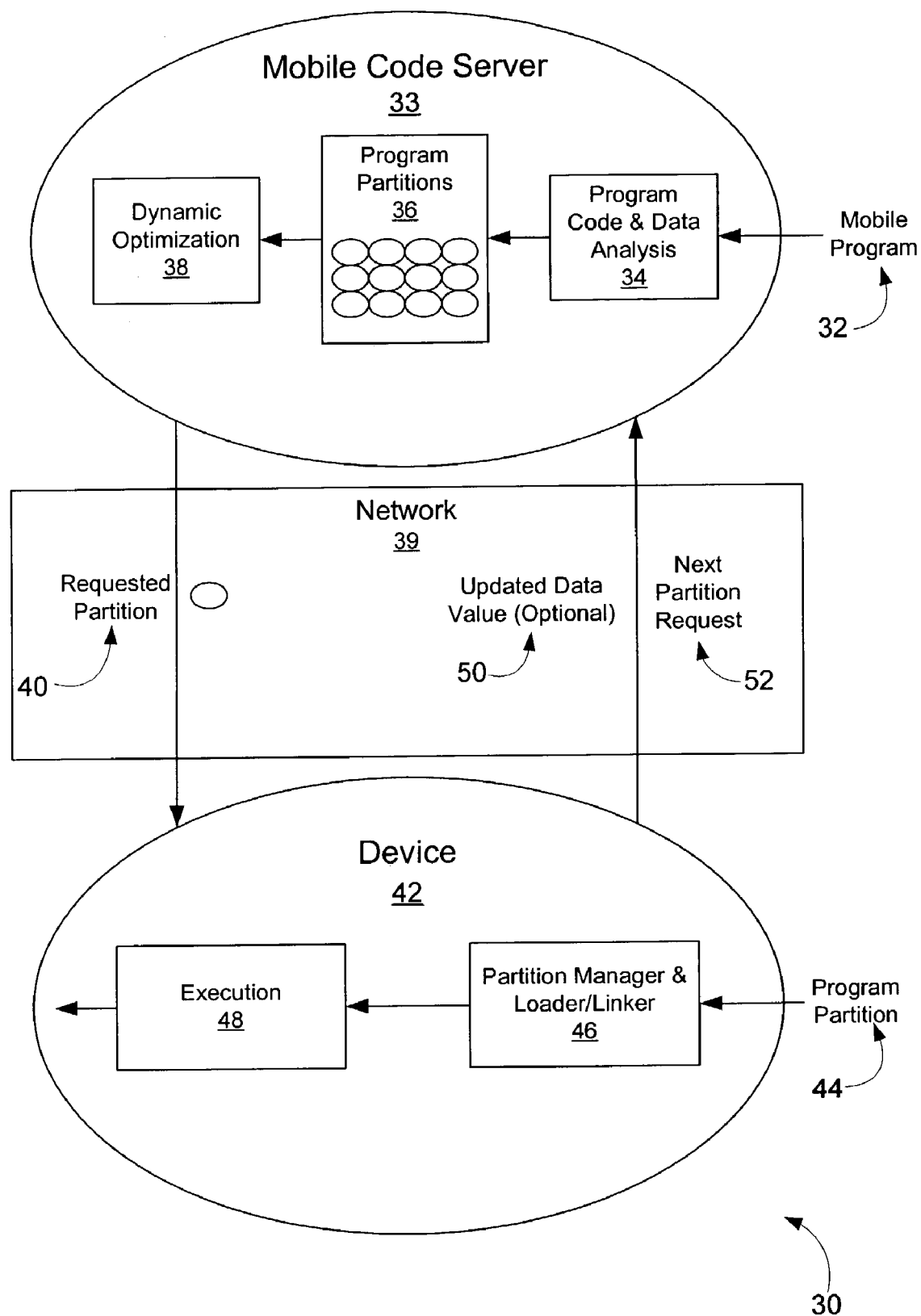

FIG. 2 shows a block diagram illustrating a program partitioning system, according to one embodiment of the present invention.

FIG. 3 shows a C language algorithm for finding recurring and nonrecurring functions within a mobile program, according to one aspect of the present invention.

Figure 4:
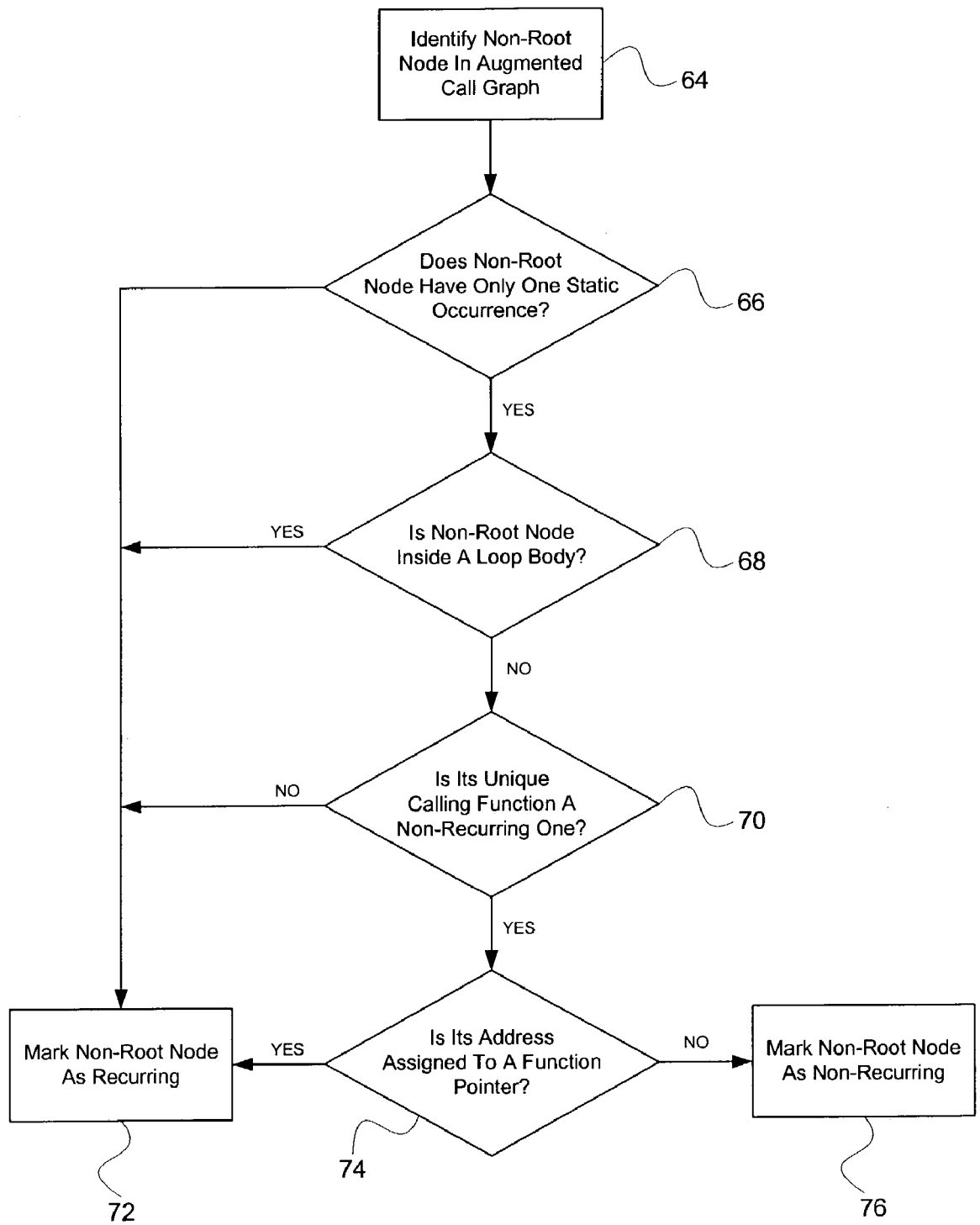

FIG. 4 shows a block diagram flow chart illustrating the steps implemented by the algorithm of FIG. 3 for identifying recurring and non-recurring functions, according to one embodiment of the present invention.

Figure 5:
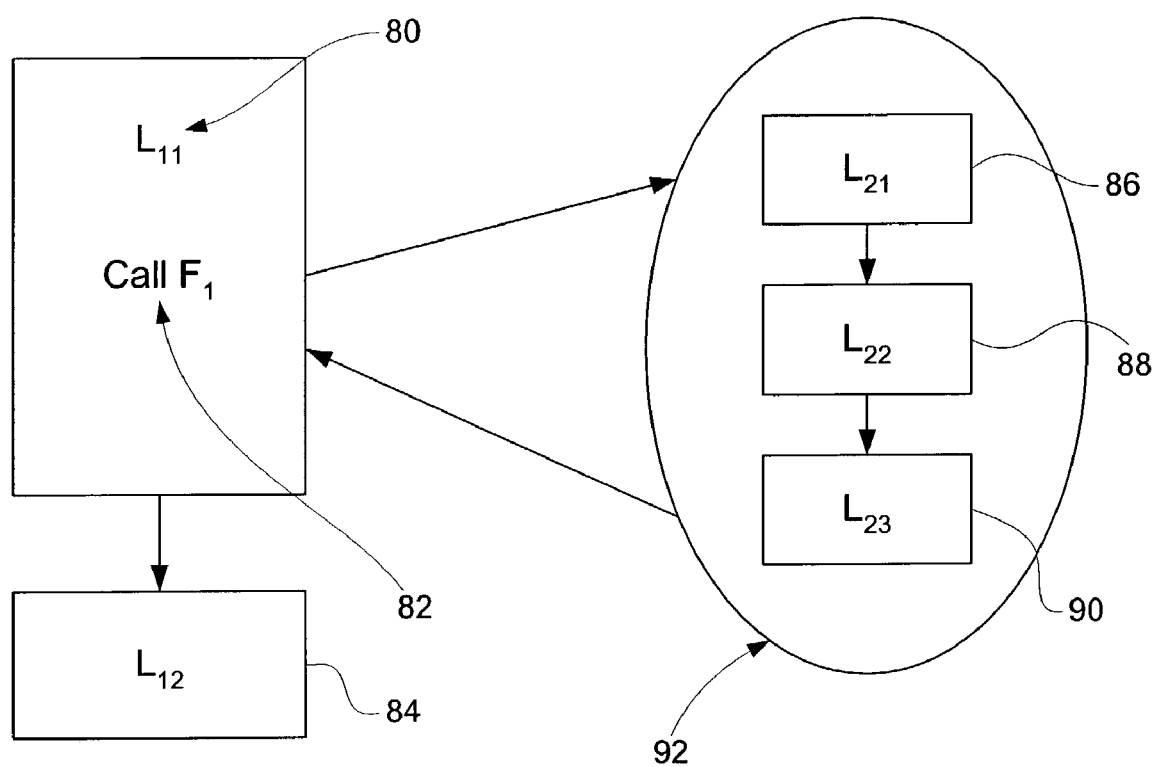

FIG. 5 shows an illustrative safe partition comprising a function call, according to an illustrative example of the present invention.

Figure 6A:
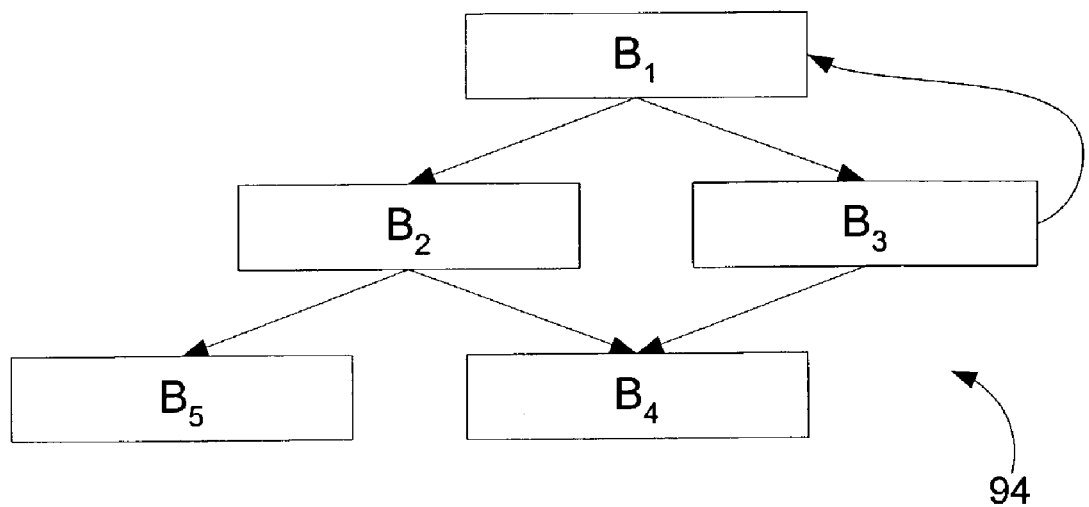

FIG. 6A shows a control flow diagram comprising a loop, according to an illustrative example of the present invention.

Figure 6B:
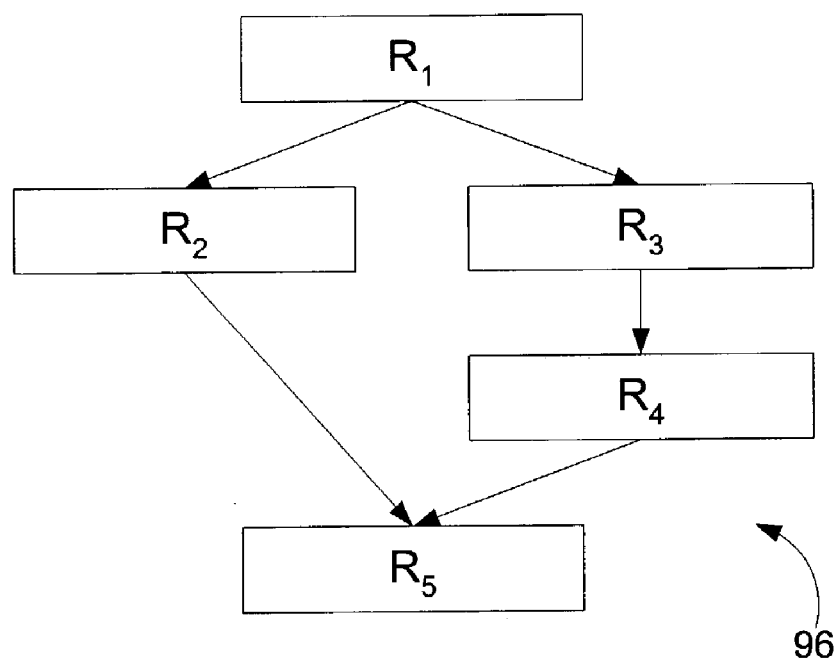

FIG. 6B shows another control flow diagram according to an illustrative example of the present invention.

FIG. 7 shows a C language algorithm for partitioning non-recurring functions, according to one aspect of the present invention.

FIG. 8 shows a C language algorithm for partitioning recurring functions, according to one aspect of the present invention.

FIG. 9 shows a C language algorithm for partitioning data in non-dereferenced data accesses, according to one aspect of the present invention.

FIG. 10 shows a C language algorithm for partitioning data in dereferenced data accesses to non-heap objects, according to one aspect of the present invention.

FIG. 11 shows a C language algorithm for minimal safe partitions merging, according to one aspect of the present invention.

FIG. 12 shows trace analysis C language algorithm for use in function caching, according to one aspect of the present invention.

Figure 13A:
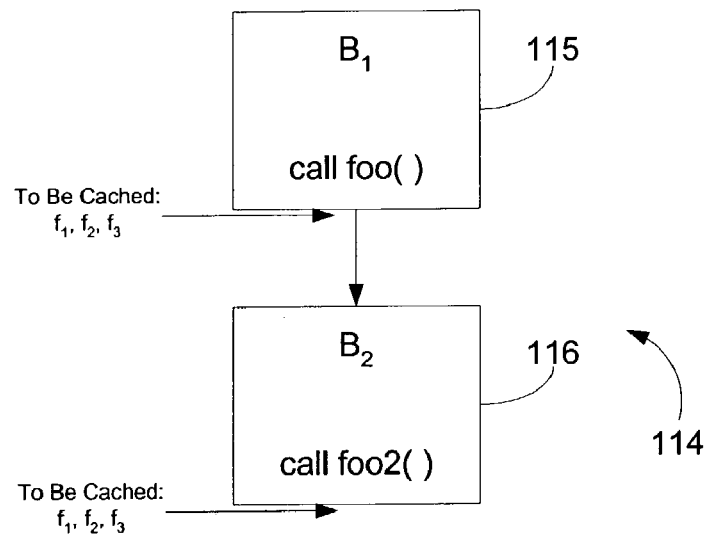

FIG. 13A shows an illustrative example of a function call where an updated cache function call is not required, according to one aspect of the present invention.

Figure 13B:
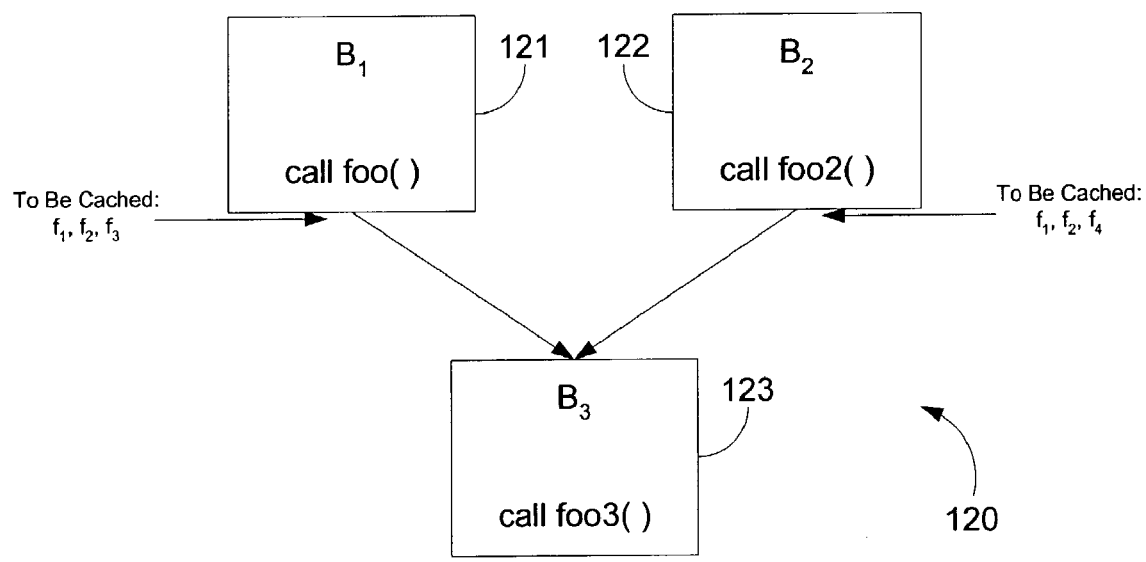

FIG. 13B shows an illustrative example of a function call where an updated cache function call is not required, according to one aspect of the present invention.

FIG. 14 shows a C language algorithm to determine if an updated cache function call is needed, according to one aspect of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 2 shows a block diagram illustrating a program partitioning system 30 according to one embodiment of the present invention. It will be appreciated that the systems and methods of the present invention are described below with reference to block diagrams and flowchart illustrations. It should be understood that blocks of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a mechanism, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Referring again to FIG. 2, the program partitioning system 30 includes a mobile code server 33 and a device 42. The server 33 and device 42 communicate with each other via the network 39. The network 39 may comprise, e.g., a wired electrical connection, and infrared communication path, a cellular connection, a Bluetooth wireless connection, or any like communication medium known to those of ordinary skill in the art. The methods and computer program products of the present invention operate on the mobile code server 33 to partition mobile programs 32 such that only partitions of the mobile program 32 are transmitted to the memory-limited device 42. The information included in each program partition is adequate for its execution and the mobile code partitions are downloaded into the 42 one-by-one on demand. Because the device only receives executable, partitioned portions of the mobile program 32, the device 42 can execute programs the device cannot otherwise execute due to the limited memory of the device 42. According to one illustrative embodiment of the present invention, the device 42 is a memory-limited tamper resistant device, such as a smart card. Though the remaining disclosure will be presented with reference to a smart card as the device 42, it will be appreciated that the device 42 may represent any security device or memory-limited device which receives programs from a server 33, such as a PDA, mobile phone, handheld computer, or the like.

According to the present invention, the mobile code program 32 first undergoes a program code and data analysis 34. As will be described in further detail below, the program code and analysis 34 identifies the safe program partitions that can be downloaded from the server 33 on demand into the device 42 just before execution of the program partitions in the device 42. A safe program partition ensures tamper resistance because a sequence of such partitions does not reveal control flow information. According to an illustrative example, if $L_1, L_2, \ldots, L_n$ represent a series of program partitions transmitted from the server 33 to the device 42 using a particular program partitioning scheme and a device cache policy (also referred to herein as a client policy), the following sequence of program partitions as the one which leaks control flow information (violating tamper resistance):

$$\ldots, L_i, L_k, \ldots, L_i, L_m, \ldots$$

In this sequence program partition $L_i$ appears in the sequence followed by program partition $L_k$ at some time, but later, $L_i$ appears again followed by program partition $L_m$ which is different than $L_k$. If such a sequence appears, then the attacker can guess that program partition $L_i$ might be a control block which controls the execution path to $L_k$ or $L_m$. Therefore, it should be appreciated that a safe partition of a program is a partition of a program which can never appear twice in a sequence such as shown by the sequence of partitions above. The concept of the safe partition is used by the systems, methods and computer program products of the present invention to partition programs transmitted to a device 42. Furthermore, a minimal safe partition is the smallest safe partition such that any sub partition of the minimal safe partition will reveal sequence and thus, control information.

Referring again to FIG. 2, according to the present invention the mobile program 32 is partitioned in the server 33 for its code and data, resulting in independent program partitions which include both code and the data accessed by the code. Despite the partitioning, the information included in each program partition is adequate for its execution. By observing these program partitions downloaded to the device 42 from the server 33, an attacker is unable to guess which branches are taken in the program and what is the control flow of the program. This tamper resistance property is valuable for secure embedded devices, such as smart cards, which may hold sensitive information and/or carry out critical computation such as financial transactions. According to one aspect of the invention, the program code and data analysis 34 is implemented by a program partitioning algorithm (not illustrated) operable to compile C and C++ mobile programs.

After the program partitions are identified, the server 33 partitions the program into multiple program partitions 36. The partitioning may also be implemented by the program partitioning program. After the partitions are generated, the partitions are dynamically optimized 38 such that a minimal number of safe program partitions are combined while still ensuring that the combined partitions do not reveal information regarding the control flow behavior of the program when they are transmitted to the device 42. The merging of partitions is discussed in detail with reference to a merging algorithm, below. It should be appreciated that combining partitions minimizes the number of transmissions from the server 33 to the device 42. From the memory utilization point of view, it is preferred that the safe partition be as small as possible, or a minimal safe partition. However, because transmitting a number of small code snippets through a network at runtime may lead to very low efficiency, adjacent minimal safe partitions may be combined into a larger one and the result will still be safe in that the transmission of the partitions to the device 42 will not result in control flow information leakage.

Dynamic optimization, which may also be performed by the program partitioning program, can also query the device 42 to determine its memory requirements or cache policies such that the appropriate number and size of partitions are transmitted to the device 42. It will be appreciated that in partitioning a program to prevent control flow information from being discoverable as program partitions are transmitted from the server 33 to the device 42, it is important that the systems, methods and computer program products of the present invention select only those safe partitions that will not leak program control flow information by observation of their sequence when transmitted at a client's request. Safe partitioning according to the present invention is based not only on how a program is divided and transmitted, but also on how and when those partitions are sent via the network 39 to the device 42. Because what is transmitted to the device 42 depends on the cache policy of device 42 (e.g., whether to cache whole or part of incoming program partitions or not), it will be appreciated to those of skill in the art that safe program partitioning depends both on how to divide the program and on client policy of managing partitions.

According to one aspect of the invention, the requested mobile code partitions 40, 44 are downloaded into the device 42 one-by-one on demand. According to one aspect of the present invention, at the server side, each requested partition might be dynamically optimized at an intermediate form (IF) level before being sent to the embedded device. Because the program partitions are not transmitted in assembly code, the communication between the server 33 and device 42 can occur faster than otherwise possible if the partitions are transmitted in native code, such as binary form, which may be several times larger than the intermediate form.

Upon receiving a partition, the device 42 executes its partition manager and loader/linker 46, which determines the correct destination for the partition. The partition manager 46 therefore resolves the partitions and registers their locations in memory. After executing a program 48, the device 42 communicates any required results, or updated data values 50, back to the server 33. Because the device 42 may not update data values each time a partition is executed, the updating of data values is optional. After execution 48 the device 42 may transmit a next transmission request 52 to the server to request the next partition required to execute a function.

As noted above, tamper resistance is affected both by program partitioning methods or techniques and a client's caching policies because together these determine the partitions that are transmitted through the network. Systems, methods and computer program products of the present invention may function to download partitions to a device operating under any of three separate device cache policies: (1) 'Keep Everything Received'; (2) 'Keep Nothing Received'; and (3) 'Keep Partitions To Which Control Is Guaranteed To Return'.

Under 'Keep Everything Received', a device will keep every program partition the server sends to it until the embedded program finishes execution. This policy is the least memory efficient one and puts highest memory burden on the client device. Even if a program partition will never be accessed again in the future, the device has to keep it in its local memory, wasting precious memory resource in embedded devices. However, because the device permanently stores program partition, this policy does not raise significant security concerns because program partitions need not be transmitted to the device more than once.

Under 'Keep Nothing Received', a device will discard the program partition immediately after its execution. This policy puts least memory burden on client device because the device only needs to keep a single program partition currently executing. This policy may be applied in the situations where client's memory is very limited. Because client will keep nothing, every program partition must be retransmitted when it is needed.

Under the third policy, 'Keep Partitions To Which Control Is Guaranteed To Return', a device will keep the safe partitions which control is guaranteed to return back. For examples of such partitions, consider a basic block containing a function call. Under this policy, after the function call, the control is guaranteed to return back to the calling basic block which is kept in memory under this policy. This policy places much less memory burden on client device than keep everything received policy because it only keeps partitions which will be definitely accessed again in the future.

Next, program partitioning algorithms according to the present invention will be considered. These partitioning algorithms partition the code and data of the program such that no information regarding the control flow behavior of the program is leaked out.

According to one aspect of the present invention, systems, methods and computer program products of the present invention implement a program partitioning algorithm applied to each function of a mobile program. Thus, according to one embodiment of the invention, the program partitioning is applied on a function by function basis. Continuing with the illustrative embodiment in which the device is a smart card, functions, which are well known in the art, may be transmitted to the smart card with data suitable for the smart card to execute the function. The smart card will then execute the function, returning a response to the server which provided the function. As described above, control information leakage comes from repeatedly sent partitions from server. Therefore, whether a function is capable of being invoked multiple times during a program run is critical to tamper-resistant partitioning algorithm.

Because retransmission of a program partition (or a function) will result in the possibility of control flow information leakage, methods and computer program products of the present invention classify functions as non-recurring and recurring functions. Only after this classification occurs can the partitioning of a program occur.

Non-recurring functions are those functions that will be called at most once during the program execution. As such, the functions need not be transmitted to the device multiple times for a program to execute. An illustrative example of a non-recurring function is the main function in C language because it occurs only once in a C program. Other examples of non-recurring functions include program initialization functions and finalization functions. On the other hand, recurring functions are those functions which may be called multiple times. These raise a clear and significant concern of control flow information leakage which the systems, methods and computer program products of the present invention seek to eliminate.

According to the present invention, a simple static program analysis reveals whether a function is recurring or non-recurring. An algorithm 60 implementing such an analysis, in C language, is illustrated in FIG. 3. According to one aspect of the invention, the algorithm 60 comprises at least a portion of the program partitioning algorithm executed by the server 33. As shown in the algorithm 60, an augmented program call graph, as is well known in the art, is first built. Each node in the call graph is augmented by three pieces of information: (1) whether the function has only one static occurrence; (2) whether the function is ever called in a loop body; and (3) whether the address of the function is ever assigned to a function pointer. A breath first traversal of the augmented call graph then occurs.

The function of the algorithm 60 is illustrated in block diagram form in the flow chart of FIG. 4. The flow chart illustrates that after an augmented call graph is constructed, a non-root node in the augmented call graph is identified (block 64). As shown in FIG. 4, each non-root node is then subjected to a series of queries to determine if the non-root node is non-recurring. First, the algorithm determines if the non-root node has only one static occurrence (block 66). If not, the non-root node is marked as recurring (block 72). Otherwise, the algorithm determines if the non-root node is within a loop body (block 68). If so, the non-root node is marked as recurring (block 72). If not, the algorithm next determines if the non-root node's unique calling function is a non-recurring one (block 70). If not, the non-root node is marked as recurring (block 72). Otherwise, the algorithm determines whether the non-root node's function is assigned to a function pointer (block 74). If so, the non-root node is marked as recurring (block 72). Otherwise, the non-root node is marked as non-recurring (block 76). Finally, although not illustrated, each non-root node follows this series of inquiries, and each is marked as either recurring or non-recurring using this process.

It will be appreciated that the algorithm 60 illustrated in FIG. 3 and represented by the block diagram flow chart of FIG. 4 does not handle functions without static occurrence that are not included in the augmented call graph. That is, if a function has no static occurrence, the method of the present invention will assume it is called through a function pointer, and will be categorized as a recurring function by default. Therefore, this algorithm 60 is a conservative one because it does not perform pointer analysis. Rather, whenever the address of a function is assigned to a function pointer, the algorithm 60 assumes that the function is a recurring one. Because there are typically only a few non-recurring functions, the conservativeness of the algorithm 60 has little impact in practice.

According to one aspect of the present invention, the simple static program analysis revealing whether a function is recurring or non-recurring is implemented by the program partition algorithm. After dividing the partitioning problem into non-recurring function partitioning and recurring function partitioning, the program partitioning algorithm is ready to partition the program. The function of the program partitioning algorithm of the present invention will net be discussed with respect to the three client cache policies discussed above.

First, under the 'Keep Everything Received' policy, a client device will keep every partition it receives. Thus, every partition of the program will be sent through the network at most once. As such, there is no potential danger that the control leakage will occur because it only occurs from repeatedly transmitted partitions. Therefore, arbitrary partitioning can occur and the transmission will remain safe.

The minimal safe partitions are each basic program block, and the server can simply send out, using the program partition algorithm, each program partition the client requests.

On the other hand, the program partitioning algorithm must prevent partitions from being retransmitted under both the 'Keep Nothing Received' and 'Keep Partitions To Which Control Is Guaranteed To Return' policies. The reason for this is that partitions may be transmitted regularly and multiple times under each of these policies due to the fact that the device memory does not retain a permanent copy of all program information it needs to execute under all conditions. Before the partitioning algorithms implemented by the present invention for each of these policies are discussed, the effect of function calls to tamper-resistant program partitioning should be briefly addressed so as to make clear the purpose and function of the partitioning algorithms of the present invention.

A sample function call within a safe partition is illustrated with respect to FIG. 5. As shown in FIG. 5, in safe partition $L_{11}$ 80, there is a function call $F_1$ 82. The function body 92 of $F_1$ 82 is shown on the right hand side of FIG. 5. When a client device encounters the function call, it will ask for the safe partitions of function $F_1$ 82 and it will discard safe partition $L_{11}$ 80 to maximize the available memory for the incoming program partitions under the 'Keep Nothing Received' policy. When the execution of function $F_1$ 82 is complete, the control will return to $L_{11}$ 80. The client then has to request the retransmission of $L_{11}$ 80. Therefore, the resulting partition sequence sent through network is:

$$\ldots, L_{11}\ 80, L_{21}\ 86, L_{22}\ 88, L_{23}\ 90, L_{11}\ 80, L_{12}\ 84.$$
$$\ldots$$

$L_{11}$ 80 is followed by $L_{21}$ 86 and $L_{12}$ 84 respectively. This violates the strict tamper resistance definition due to the fact that $L_{11}$ can be noted as a possible control partition. Thus, it will be appreciated that a function with a function call cannot be partitioned under the 'Keep Nothing Received' policy. A similar result occurs under the 'Keep Partitions To Which Control Is Guaranteed To Return' policy. Nevertheless, $L_{11}$ 80 is not a control block which controls the branch to $L_{21}$ 86 or $L_{12}$ 84 and from the above sequence, an attacker can not get any correct control flow information inside a function. In a worst case scenario, an attacker may know there is a function call in $L_{11}$ and $L_{21}$, $L_{22}$, $L_{23}$ consist of the function body. However, under both the 'Keep Nothing Received' and 'Keep Partitions To Which Control Is Guaranteed To Return' policies function calls do not reveal control flow information of the program as branches do, as the block following function call is always executed assuming normal return of the call. Rather, function calls simply are manifestations of modular design and might reveal modularity information which can not be utilized effectively to alter control flow.

Next, methods and computer program products to partition programs under the 'Keep Nothing Received' and 'Keep Partitions To Which Control Is Guaranteed To Return' policies will be described for partitioning a non-recurring function and a recurring function. Because the partitioning algorithms for partitioning non-recurring and recurring functions are the same for both the 'Keep Nothing Received' and 'Keep Partitions To Which Control Is Guaranteed To Return' policies, the partitioning algorithms for each policy will be considered simultaneously.

Referring now to non-recurring functioning partitioning, the present invention will not partition a loop body, where a loop occurs when two or more separate partitions may follow a particular partition. FIG. 6A shows a CFG 94 including a loop, according to an illustrative example of the present invention. The loop comprises partitions $B_1$, $B_2$, $B_3$ and $B_4$. Because $B_1$ can be followed by either $B_2$, $B_4$ or by $B_3$, $B_4$, it will be appreciated that the partitions which comprise the loop must remain together, or control flow information may be accessible. As a result, methods and computer program products of the present invention, and in particular, the program partition algorithm, maintain loop bodies together (i.e., the partitions comprising the loops) for transmission to a device.

A C language algorithm 100 for partitioning non-recurring functions is illustrated in FIG. 7, according to one embodiment of the present invention. Although the algorithm 100 is directed to devices operating under a 'Keep Nothing Received' policy, the same algorithm 100 is applicable to devices operating under the 'Keep Partitions To Which Control Is Guaranteed To Return' policy. The algorithm 100 creates minimal safe partitions using the rules set forth above. According to one aspect of the present invention, the algorithm 100 may be implemented by the program partitioning algorithm. Applying the algorithm 100 to the illustrative example of FIG. 6A, the minimal safe partitions should be L1={$B_1$, $B_2$, $B_3$, $B_4$} and L2={$B_5$}. The program partition execution sequence is given by $L_1$, $L_2$ but the sequence sent through the network is $L_1$, $L_2$, which is tamper-resistant. It will be appreciated by those of skill in the art that the device may not require all of the partitions in $L_1$ to execute a desired function. For instance, the device may follow the flow of sub-partitions $B_1$, $B_2$ and $B_4$, in which case partition $B_3$ is not needed for execution. However, this partition is transmitted to the device to maintain tamper resistance, as not including it may require its retransmission to the device violating tamper resistance.

Next, methods and computer program products for partitioning a recurring function will be discussed. Like the partitioning of a non-recurring function, a recurring function having a loop therein ay result in control flow information leakage during transmission of the partitions from a server to a device. Therefore, the same rule applies that a loop-body cannot be partitioned. A C language algorithm 104 for partitioning recurring functions is illustrated in FIG. 8, according to one embodiment of the present invention. Although the algorithm 104 is directed to devices operating under a 'Keep Nothing Received' policy, the same algorithm 104 is applicable to devices operating under the 'Keep Partitions To Which Control Is Guaranteed To Return' policy. The algorithm 104 creates minimal safe partitions using the rules set forth above and can be implemented by the program partitioning algorithm executing in the server.

It will be appreciated that the partitioning algorithm 104 for recurring functions is virtually same as the algorithm 100 for non-recurring functions, but the runtime behavior of the server side is different. For non-recurring functions, a server according to the present invention simply sends the safe partitions as requested by the client. But for recurring functions, the server will send a predetermined safe partition sequence which includes all the reduced nodes in the recurring function. However, this sequence cannot be an arbitrary sequence. FIG. 6B shows CFG partition sequence 96 according to another illustrative example of the present invention. For example, in FIG. 6B, $R_2$ should not be transmitted before $R_1$. Rather, the sequence corresponds to one of the topological order of the reduced graph nodes. Due to acyclic nature of the reduced graph and topological order imposed on the sequence, the sequence is tamper-resistant.

For the CFG 96 of FIG. 6B, the server will predetermine a topological sequence for example $R_1$, $R_2$, $R_3$, $R_4$, $R_5$. In runtime, the server always sends out this sequence to the client regardless of control flow. Among the program partitions sent, there are dummy safe partitions. For example, if the real execution path is $R_1$, $R_2$, $R_5$, then $R_3$, $R_4$ are dummy partitions.

It will be appreciated that the partitioning algorithms described above with respect to FIGS. 7 and 8 provide the safest minimal partitions. According to a less preferred embodiment of the present invention, safe, but not necessarily minimal, partitions may also be identified. To execute such a partition, the following steps may be taken to partition a main program into safe regions: (1) locate each loop entry and loop exit, and take the union of the nodes as a safe region; and (2) make the other basic blocks in the loop body, but not in the first safe region, the second safe region. These steps are similar to the partitioning of non-recurring functions described above, but do not ensure minimal partitions. Additionally, the following steps may be implemented to partition a procedure body: (1) create reduced CFG for the procedure body; (2) because the entry node of the reduced CFG for that procedure is a minimal safe region itself, set last minimal safe region to this safe region; (3) for all the successors of the reduced nodes in the last minimal safe region: if all the predecessor nodes of a particular successor node have been processed, add this successor node to the current minimal safe region, else do nothing. (4) after all the successor nodes have been processed, set last minimal safe region to current minimal safe region; and (5) repeat steps 3 and 4 until the exit node of the reduced CFG has been processed. These steps are an alternative to, but similar to the partitioning of recurring functions described above, but do not ensure minimal partitions.

As noted above, each of the algorithms discussed herein may be implemented by the program partitioning algorithm within the server 33. Therefore, the program partitioning algorithm can effectively identify recurring and nonrecurring functions within a mobile program, and can partition the mobile program according to the methods set forth above. Given the cache policy of a device, the program partitioning algorithm can also transmit the appropriate partitions to a client device.

Although the partitioning of programs has been described in detail, it will be appreciated that another aspect of the present invention is in the partitioning of data. It will be appreciated that memory-limited devices such as smart cards contain not only limited memory available for executing programs, but also limited memory for storing data. Therefore, the systems, methods and computer program products of the present invention and described above with respect to program partitioning may also be used to effect data partitioning. In particular, using the present invention the server 33 may transmit only the data required for use by the device 42 to execute a current algorithm. To run program partitions on the client side, the data needed by the code partitions is required. Rather than transmitting the sending the whole data segment plus stack and heap of the program, which is very inefficient, methods and computer program products of the present invention only send the data accessed by the particular code partitions.

The data accesses of a partition of code can be divided into three categories: (1) non-dereferenced data accesses, which corresponds to direct accesses to locally defined variables in stack and globally defined variables in data segment (no pointer dereference is involved); (2) dereferenced data accesses to non-heap objects, in which a pointer can point to an object residing in stack or program data segment. Those objects are statically defined and allocated in the program so accurate points-to information statically for such objects are identifiable; and (3) dereferenced data accesses to heap objects: a pointer pointing to a heap object. Heap objects are allocated and freed dynamically. Algorithms 108, 110 for partitioning data in the first two categories above are illustrated, respectively, in FIGS. 9 and 10. Like the algorithms considered above, these algorithms may be implemented by the program partitioning algorithm such that the program partitioning algorithm can effectively partition both a program and the data necessary to operate a partitioned program. It should be appreciated that the third category, dereferenced heap accesses, is preferably managed independently by the client device because of the complexities associated with extracting accessed heap objects.

Next, an additional method of the present invention, the merging of safe partitions, will be explained in detail. Like the above methods, which may be implemented by computer program products, and more specifically, the program partitioning algorithm, the methods of merging safe partitions also occurs within the server 33. The merging of safe partitions may also be implemented by the program partitioning algorithm.

The algorithms disclosed above illustrated how the present invention is operable to identify minimal safe partitions under different device cache policies. According to the tamper-resistant partitioning algorithms described herein, a function body is partitioned into multiple safe partitions in such a way as to guarantee that during every invocation of the function, the sequence of safe partitions sent is identical, so as to eliminate the leakage of program control information from the differential of sequences of program partitions. Thus, the sending sequence of the safe partitions during a program execution is actually predetermined and fixed, and every time the same sequence will be transmitted. Because of this important property, adjacent safe partitions may be merged into a larger one while not compromising tamper resistance.

Merging multiple partitions reduces the transmission time for downloading programs to the device. Minimal safe partitions create inefficiencies due to the fine granularity during execution. In order to alleviate this problem, the present invention provides a novel solution that is scalable to the amount of available data and code memory on the device. This is achieved by merging adjacent minimal safe partitions under the memory capacity constraint. It is shown that doing so does not violate the tamper resistance property.

The merging algorithm (e.g., implemented by the program partitioning algorithm or a separate merging algorithm within the server) is guided by resource limitations of the device's code size limit and data size limit. Therefore, the merging algorithm takes the original minimal safe partitions and the device's code size limit and data size limit as an input. The merging of code partitions then occurs to ensure that a merged partition, which is the sum of multiple partitions, will not exceed the device's memory resources. Additionally, this merging can occur for both code and data. Therefore, the result of data merging is the union of referenced data. To effect merging, methods of the present invention find a partition of items so that the number of partitions is minimum under two conditions: (1) the partition can not reorder the items; and (2) if a single original item has exceeded resource limit by itself, it is not merged with other items. FIG. 11 shows an algorithm 111, according to one embodiment of the present invention, for minimal safe partitions merging.

Finally according to yet another aspect of the present invention, systems, methods and computer program products of the present invention can further optimize the ability of a device having inadequate memory to store program functions. In particular, in the absence of any mandatory requirement to keep partitions in memory, a rather large overhead may be incurred to fetch the needed partitions from the server every time they are needed. For instance, where the device and server communicate via a cellular network, these communications may become expensive. Even with safe partitions merging, a huge communication and downloading overhead can result. To reduce runtime overheads, the present invention can implement function caching in the client device. Function caching will enable a client to leave a part of memory dedicated for caching a set of functions. When the cached function is called again, client will not request it from the server but will fetch it from local memory directly. Which function(s) should be kept in the client memory at a given program point may be determined statically by the program partitioning algorithm, which is also referred to hereinafter as the compiler. A static solution is preferred because a dynamic cache eviction algorithm on a client side device is expensive.

The framework of the function caching mechanism of the present invention consists of three steps: (1) program instrumentation; (2) hot function set identification and optimization; and (3) compilation/runtime environment support. In particular, certain sets of functions, or hot function sets, are regularly called by a program during a period of time. Function caching identifies the hot function set at each call site. The hot function set for each call site is decided statically and fixed during program run. For each user-defined function call, instructions dump out the ID of the calling function, the ID of the calling basic block, the ID of the called function. In this way, a trace is generated with the information of which function is called at which program point. After obtaining the function call trace, methods and computer program products of the present invention are operable to capture patterns in the trace. Hot functions are those functions whose IDs are in high frequency patterns over a certain period.

The trace analysis algorithm then divides the lifetime of a hot function set for a trace region into three phases. For each phase, a different strategies may be applied as follows:
(1) Hot set growing and stabilizing. In this phase, a new hot set is being built and maybe not all the hot functions in this region have been included in the hot set. In this phase, the algorithm allows the current hot set to grow without interference. When the length of calling trace scanned exceeds the predefined maximum size of a hot set, current hot set enters maintaining phase.
(2) Hot set maintaining. In this phase, hot set for this region has been built up. The function calls that follow are supposed to exhibit a hit in the hot set. During this phase, the total hot set misses since the hot set was built up are counted. If the misses exceed the predefined maximum misses allowed, current hot set enters discarding phase.
(3) Hot set discarding. Hot set enters this phase because hot set misses are observed which are indications of the hot set transition point. Once upon a hot set enters this phase, the functions in the hot set are evicted and if the hit count of a function is greater than or equal to a predefined minimum hit frequency, the region currently examined will be guided to cache this function. A frequency check is executed to get rid of the noises in the hot set.

There are several control parameters in the trace analysis algorithm. By increasing the max hot set size longer patterns in the trace may be discovered while at the same time taking risk to introduce noise and combine multiple hot sets into one. Max misses allowed has a similar effect to max hot set size. Minimum hit frequency is a guard to filter noise in the hot set and to ensure the hot functions found are hot enough. Different programs show different calling trace behavior. These parameters allow us to find a per application balance between performance and memory requirement easily. The C language algorithm 112 of FIG. 12 shows the trace analysis algorithm in a high-level view.

The hot function set at each call site is the function set to be cached at that point. The to-be-cached set might be different from one point to another. Compilation and runtime environment support is necessary to enable hot function set transition. During compilation of the mobile code program, our compiler inserts a function call update_cached_function (int current_func_id, int current_BB_id) just before a user defined function call when necessary. Such a function call is necessary unless statically compiler can establish the fact that in runtime, currently cached function set at the call site is equal to the function set to be cached. Whether the two sets are equal might be unknown at a join node due to different sets being in cache on different edges of the join. The mobile program requests the runtime environment to update the cached functions through the inserted function call. When the runtime environment loads a program, it also loads a map of call sites to their corresponding hot function sets. When it receives a request, it will compare the corresponding hot function set for current call site with the functions currently cached, find out the functions to be cached but not locally available, then ask for them from server.

It will be appreciated that the hot function set to be cached at each call site is known as a result of the trace analysis algorithm. However, each call site potentially has different hot function set. To dynamically change the current cached function set to the function set to be cached at a particular call site, an updated cache function call may compute the change. This function may be implemented by the program partitioning algorithm. Preferably, the call occurs just before each user-defined procedure call and will introduce some runtime performance overhead. On the other hand, if the compiler can guarantee that the current cached function set is equal to the function set to be cached, the inserted updated cache function call is unnecessary to improve performance. Moreover, according to one aspect of the present invention, if two hot function sets are not equal, it is possible to utilize a simpler version of the call which provides the difference to runtime environment explicitly so that runtime environment doesn't need to compute the difference itself, resulting in lower cost. An illustrative example is illustrated in FIG. 13A.

In the example 114 of FIG. 13A, in basic block $B_1$ 115, there is a function call foo( ). To be cached set is $f_1$, $f_2$, $f_3$. The only predecessor of basic block $B_2$ 116 is $B_1$. So when program runs to $B_2$, 116, it is guaranteed that the control comes from $B_1$ 115. As such, it is known that the current cached set is $\{f_1, f_2, f_3\}$. It is same as the to-be-cached set at function call site foo2( ). Therefore, an updated cache function call to change the cached function set is not required. FIG. 13B shows an example where an updated cache function call is needed. In this example, block $B_3$ 123 has two predecessors, block $B_1$ 121 and block $B_2$ 122. The current cached function set will be different depending on the control comes from which predecessor. Thus, statically there is no way to know which set is cached currently in runtime, so an updated cache function call is needed. FIG. 14 shows a C language algorithm 126 to determine if an undated cache function call is needed, according to one aspect of the present invention.

After identifying the compiler guided function set to be cached at each call site, the compiler can derive the memory requirement of the program. It will first guarantee the hot functions memory requirement at each call site to achieve good performance, then it will examine the maximum size of minimal safe partitions as seen when a specific hot set is active. It takes the sum of these two as compiler recommended memory allocation size at a specific call site.

As is disclosed herein, the present invention provides efficient and tamper-resistant program partitioning for secure embedded devices (such as smart cards). The present invention provides tamper resistance in the transmission of programs to devices because there are no observable differentials in the sequences of program partitions sent through the network. The different policies of caching partitions in the device receiving program partitions impacts tamper-resistant program partitioning techniques and the performance of the device in executing functions (including memory requirements inside the device and the speed of execution of a program application). The partitioning algorithms of the present invention can partition applications into very fine-grained pieces. However, because runtime performance may be degraded if partitioning is performed without further optimizations, merging of safe partitions and function caching are two optimizations to reduce runtime overhead encountered due to program partitioning.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the present invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of transmitting a program to a device, comprising:
    analyzing a program to identify one or more executable functions in said program;
    determining whether each of the one or more executable functions is a recurring or non-recurring function, wherein a non-recurring function is executed only once during operation of the program, and wherein a recurring function is executed more than once during operation of the program;
    partitioning the program into a plurality of program partitions based at least in part on the determination of whether each of the one or more executable functions is a recurring or non-recurring function; and
    transmitting the plurality of program partitions to the device, wherein each of said plurality of program partitions are transmitted to the device only once to avoid revealing control flow information of said program during the transmission.

2. The method of claim 1, wherein analyzing said program is implemented by computer program code.

3. The method of claim 1, wherein partitioning the program into the plurality of program partitions is implemented by computer program code.

4. The method of claim 1, further comprising merging at least two of said plurality of program partitions to generate a merged program partition.

5. The method of claim 4, further comprising determining a memory capacity of the device prior to merging at least two of said plurality of program partitions to generate the merged program partition.

6. The method of claim 4, further comprising transmitting said merged program partition to the device.

7. The method of claim 1, wherein partitioning the program into a plurality of program partitions comprises partitioning the program into a plurality of program partitions based at least in part on the identification of one ore more minimal safe partitions, wherein at least one of the one or more minimal safe partitions comprises two or more executable functions that form a program loop.

8. The method of claim 7, wherein each of the minimal safe partitions are transmitted in a fixed sequence to the device during execution of a recurring or non-recurring function.

9. The method of claim 7, further comprising merging at least two of said minimal safe program partitions to create a safe merged program partition.

10. The method of claim 1, further comprising reserving, in said device, memory allocated for caching at least one of said plurality of program partitions.

11. A computer program product for partitioning a program for transmission to a device, said computer program product comprising:
a computer usable medium having computer-readable code means embodied in said medium, said computer-readable code means comprising:
computer readable program code means for analyzing a program to identify one or more executable functions in said program;
computer readable program code means for determining whether each of the one or more executable functions is a recurring and or non-recurring function, wherein a non-recurring function is executed only once during operation of the program, and wherein a recurring function is executed more than once during operation of the program;
computer readable program code means for partitioning the program into a plurality of program partitions based at least in part on the determination of whether each of the one or more executable functions is a recurring or non-recurring function; and
computer readable program code means for transmitting the plurality of program partitions to the device, wherein each of said plurality of program partitions are transmitted to the device only once to avoid revealing control flow information of said program during the transmission.

12. The computer program product of claim 11, further comprising computer readable program code means for merging at least two of said plurality of program partitions to generate a merged program partition.

13. The computer program product of claim 12, further comprising computer readable program code means for identifying the memory capacity of the device prior to merging at least two of said plurality of program partitions.

14. The computer program product of claim 12, further comprising computer readable program code means for transmitting said merged program partition to the device.

15. The computer program product of claim 11, wherein the computer readable program code means for partitioning the program into a plurality of program partitions comprises computer readable program code means for partitioning the program into a plurality of program partitions based at least in part on the identification of one ore more minimal safe partitions, wherein at least one of the one or more minimal safe partitions comprises two or more executable functions that form a program loop.

16. The computer program product of claim 15, wherein each of the safe partitions are transmitted in a fixed sequence to the device during execution of a recurring or non-recurring function.

17. The computer program product of claim 15, further comprising computer readable program code means for merging at least two of said minimal safe program partitions to create a safe merged program partition.

18. The computer program product of claim 11, further comprising computer readable program code means for reserving, in said device, memory allocated for caching at least one of said plurality of program partitions.

19. A method for optimizing the performance of a device, comprising:
analyzing a program to identify at least one recurring and at least one non-recurring function in said program; and
using the identification of said recurring and non-recurring functions to partition the program into a plurality of program partitions; and
transmitting to the device a request that the device memory be divided into ideal code and data segment components for receiving the plurality of program partitions.

* * * * *